J. W. BRANNON.
AUTOMATIC CAGE LOADER AND SAFETY DEVICE FOR MINES.
APPLICATION FILED MAR. 24, 1908.
908,943.
Patented Jan. 5, 1909.
2 SHEETS—SHEET 1.
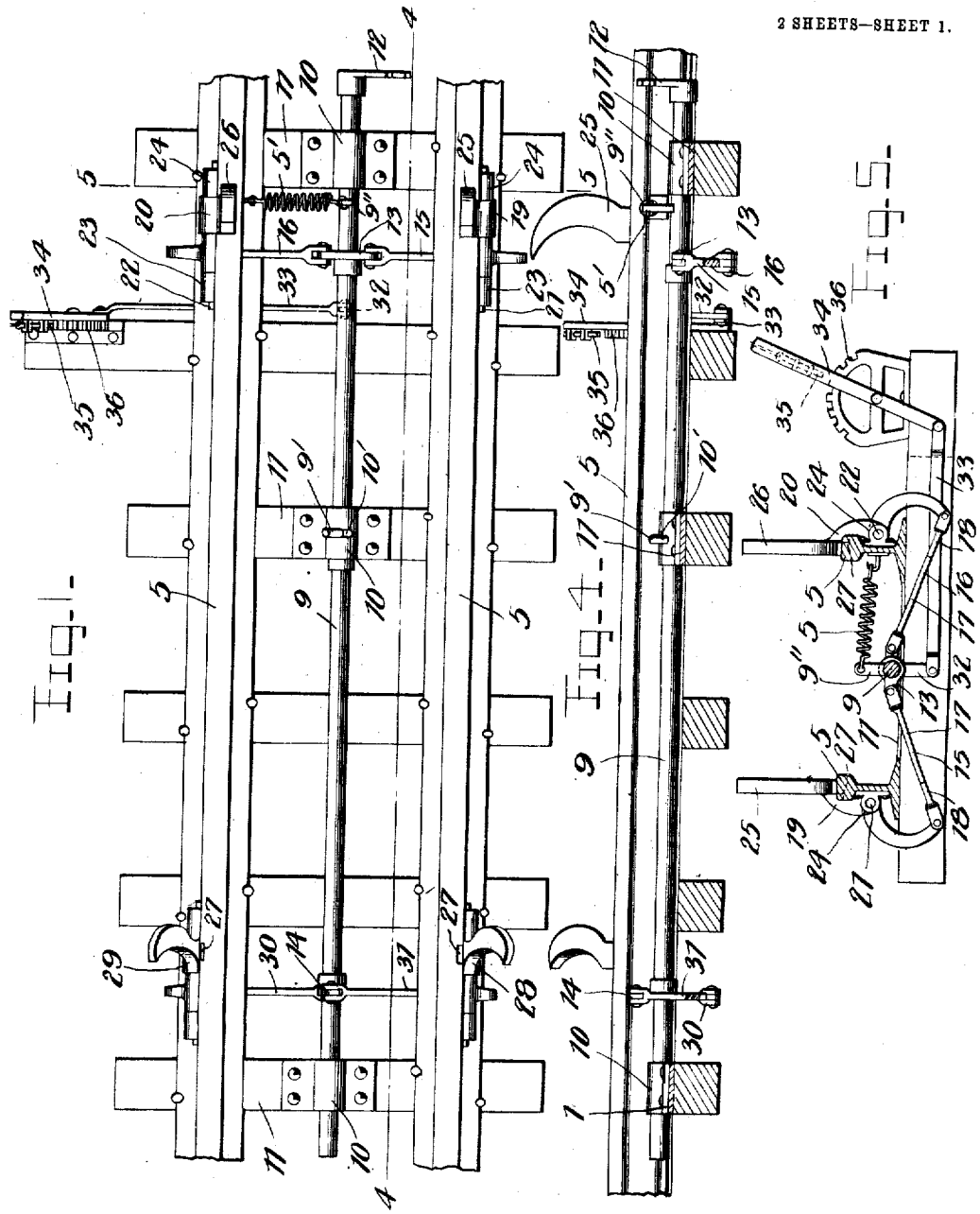
Witnesses
W. H. Rockwell
C. H. Griesbauer
Inventor
John W. Brannon
By H. R. Willson &co
Attorneys

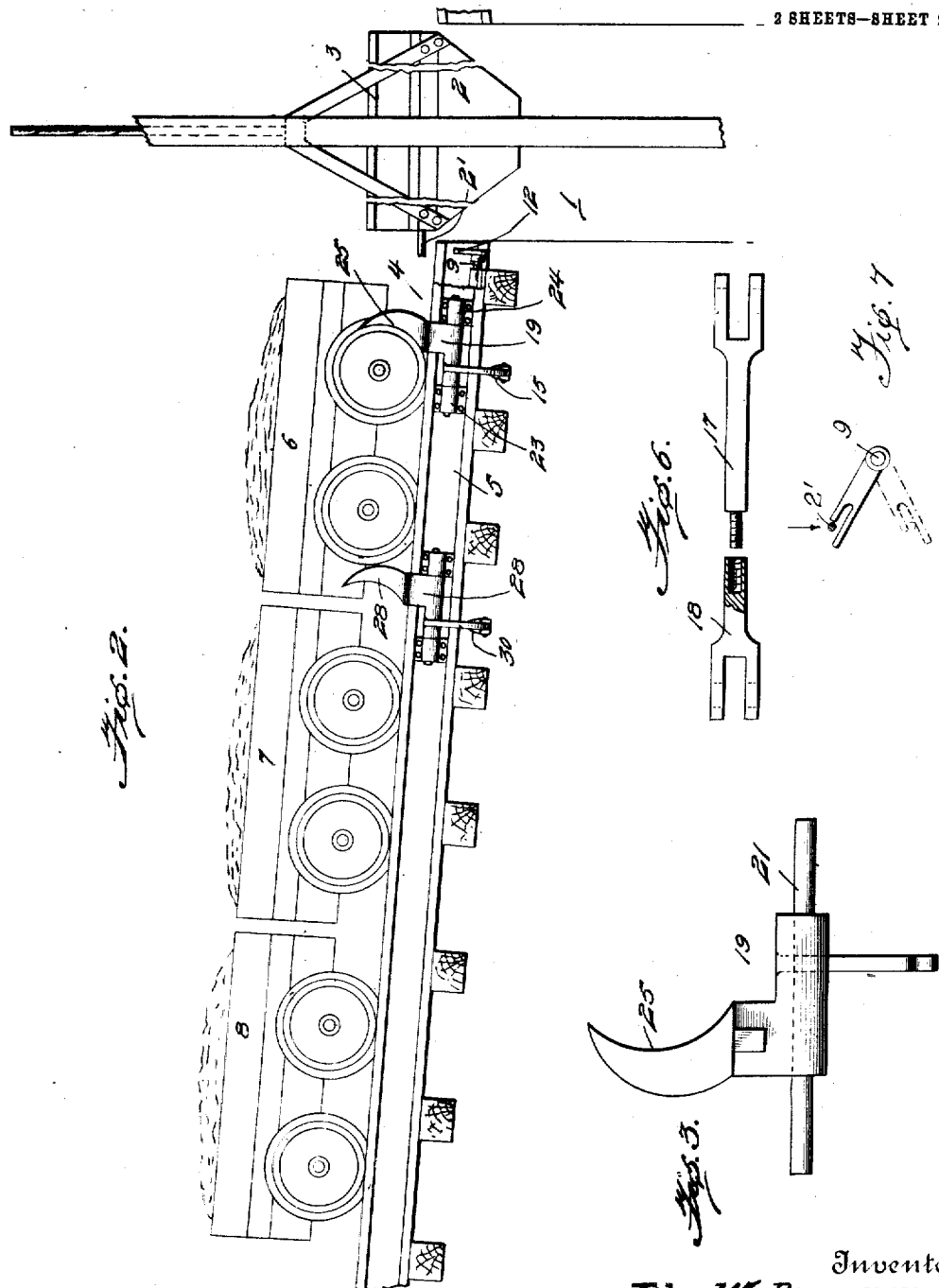

UNITED STATES PATENT OFFICE.

JOHN W. BRANNON, OF SEARCY, ARKANSAS.

AUTOMATIC CAGE-LOADER AND SAFETY DEVICE FOR MINES.

No. 908,943.  Specification of Letters Patent.  Patented Jan. 5, 1909.

Application filed March 24, 1908. Serial No. 422,942.

*To all whom it may concern:*

Be it known that I, JOHN W. BRANNON, a citizen of the United States, residing at Searcy, in the county of White and State of Arkansas, have invented certain new and useful Improvements in Automatic Cage-Loaders and Safety Devices for Mines; and I do declare the following to be a full, clear, and exact description of the invention, such as will enable others skilled in the art to which it appertains to make and use the same.

This invention relates to an automatic cage loader and safety device for mines.

The object of the invention is to provide means operated by the cage or elevator, which may be operated manually, for positively locking a car and preventing it from running into the cage shaft or pit when the cage is in elevated position, and for releasing it when the cage is in lowered position ready to receive it.

In the accompanying drawings, Figure 1 is a top plan view of this improved safety device arranged in position to permit a car to pass to an elevator or cage at the landing and to stop a following car; Fig. 2 is a side elevation showing a loaded car about to run onto a cage or elevator; Fig. 3 is an enlarged detail on one of the bumpers; Fig. 4 is a longitudinal section taken on line 4—4 of Fig. 1; Fig. 5 is a transverse section taken on line 5—5 of Fig. 1; Fig. 6 is a detail of one of the links; and Fig. 7 represents an end elevation of the bumper reversing lever, its various positions being shown in dotted lines with the cage carried operating arm shown in section.

In the embodiment illustrated a cage or elevator shaft 1 is shown, in which a cage or elevator 2 is operable and provided with spaced rails forming a track 3 to receive a car. A landing 4 is provided with an inclined track 5, the rails of which are arranged to aline with the rails of the track 3 when the cage is at the landing. Mine cars, 6, 7, and 8 are movable on the rails of the tracks 3 and 5.

The parts above described are preferably of the ordinary well known construction.

A rock shaft 9 is disposed longitudinally of the track 5, preferably midway between the rails thereof, and is mounted in keepers, as 10, bolted to the ties, preferably with plates or bars, as 11, extending between the rails under said keepers, and which form braces for the rails. One of the keepers 10, preferably the middle one, has a longitudinally disposed slot 10', in which a pin 9', carried by the shaft 9 operates to limit the turning of the shaft in opposite directions.

A bifurcated shaft-operating member 12 having one arm shorter than the other, is fixed to the shaft 9 at the end thereof, which end terminates adjacent the cage shaft in position to be operated by a trip device on the cage, as hereinafter described, to turn or rock the shaft. Spaced cross-heads 13 and 14 are fixed to the shaft 9 and arranged at right angles to each other for a purpose to be described. Links 15 and 16 are pivotally connected at one end with the cross-head 13, and at their other ends with the movable stops or bumpers, hereinafter described. These links are preferably constructed as shown in Fig. 6, comprising two sections 17 and 18, the section 17 being screwthreaded exteriorly at one end to engage a screwthreaded socket in the member 18 to provide for the lengthening and shortening of the links when desired.

Wheel-engaging stop members or bumpers 19 and 20 are fulcrumed intermediate of their ends by short shafts 21 and 22 mounted in bearings, as 23 and 24, bolted to the rails, and at one end are pivotally connected with the free ends of the links 15 and 16. The front wheel-engaging ends 25 and 26 of the bumpers 19 and 20 are curved to fit a wheel, and are adapted to be moved into and out of the path of the car wheels by means of the rocking of the shaft 9 in opposite directions. The rails of the track 5 are recessed as at 27 to receive the bumpers for holding them securely when in operative or wheel-engaging position. The cross-head 14 is also fixed to the shaft 9 in position to operate the bumpers 28 and 29 to throw them into and out of position for engaging the wheels of the second car 7, being arranged at right angles to the head 13 and serving to raise the bumpers 28 and 29 in operative position when the bumpers 19 and 20 are swung into operative position, and vice versa.

The links 30 and 31, and the bumpers 28 and 29 are constructed similarly to those connected with the head 13, and hence it is not necessary to describe them in detail.

The shaft 9 carries a short arm or lug 9", which is connected with the adjacent rail by means of a coiled spring 5', which is designed to hold the cross head 13 just past the center when a trip 2' on the cage passes out of engagement with the reversing member and said member is thus held in position ready for engagement by the trip 2' when the cage again descends. Another lug or short arm 32 is fixed to the shaft 9 to the free end of which is connected a link 33. This link 33 is connected at its other end to a lever 34, having a spring pawl 35 for engagement with a toothed quadrant 36 and which is normally held out of engagement therewith. This device is designed for manually operating and locking the shaft 9 when desired.

The cage or elevator-carried trip lever 2' is adapted to engage the reversing arm 12 of the shaft 9 on its descent and rock the shaft to swing the bumpers 19 and 20 out of engagement with the wheels of the car 6 and permit said car to run onto the cage-carried track and to rock the shaft in the opposite direction when the cage ascends. As the bumpers 19 and 20 at the front of the track 5 are lowered, those 28 and 29 in the rear thereof are raised into position to engage the car 7 and prevent its running down into the shaft. As the cage rises, the trip member 2' through the reversing member 12 rocks the shaft 9 in opposite direction to raise the bumpers 19 and 20 and to lower bumpers 28 and 29 to permit the car 7 to run down the track into engagement with the bumpers or stops 19 and 20.

I claim as my invention:

1. In an apparatus for loading mine cages or elevators, the combination of a trackway arranged adjacent the elevator shaft, a rock shaft arranged longitudinally of said trackway, a cross-head fixed to said rock shaft, oppositely extending links connected to opposite ends of said cross head, fulcrumed stop bars or wheel-engaging bumpers attached at one end to said links, means for rocking said shaft to throw said bumpers into and out of operative position, and means connecting said shaft with one of the track rails for holding it in locked position.

2. A safety device for mine cars, comprising a rock shaft adapted to be mounted longitudinally between the car tracks, spaced cross-heads fixed to said shaft at right angles to each other, a pair of bumpers pivotally connected with each of said cross-heads, means for holding said shaft in locked position, and means for rocking said shaft to lower one set of bumpers and raise the other, and vice versa.

3. A safety device for mine cars, comprising a rock shaft adapted to be mounted longitudinally between the car tracks, spaced cross-heads fixed to said shaft at right angles to each other, a pair of bumpers pivotally connected with each of said cross-heads, spring means for holding said shaft in locked position, and means for rocking said shaft to lower one set of bumpers and raise the other, and vice versa.

4. A safety device for mine cars, comprising a rock shaft adapted to be mounted longitudinally between the car tracks, spaced cross heads fixed to said shaft at right angles to each other, links pivotally connected with opposite ends of said cross heads, bumpers pivotally connected with said links, and means carried by said shaft for engagement by a cage to rock said shaft and operate the bumpers to raise and lower them alternately.

5. In an apparatus for loading mine cages or elevators, the combination of a trackway, a rock shaft arranged longitudinally thereof, a cross-head fixed to said rock shaft, oppositely extending links connected to opposite ends of said cross-head, fulcrumed stop bars or wheel-engaging bumpers attached at one end to said links, means for rocking said shaft to throw said bumpers into and out of operative position, means for connecting said shaft with one of the track rails for holding it in locked position, and means for limiting the rocking of said shaft in either direction.

6. In an apparatus for loading mine cages or elevators, the combination of a trackway, keepers arranged on the ties thereof, a rock shaft arranged longitudinally of said track and mounted in said keepers, a slot arranged longitudinally in one of said keepers, a pin carried by said shaft and operable in said slot to limit the rocking movement of the shaft in opposite directions, a cross-head fixed to said shaft, links connected to opposite ends of said cross-head, stop bars or bumpers attached at one end to said links, and means for rocking said shaft to throw said bumpers into and out of position.

7. In an apparatus for loading mine cars on to elevators the combination with a trackway arranged adjacent the elevator shaft, of car engaging means mounted on said trackway and operable to engage one car and release the other or vice versa.

8. A safety device for mine cars comprising a rocking shaft adapted to be mounted between the car tracks, longitudinally spaced bumpers connected with said rocking shaft, means for rocking said shaft to lower one bumper and raise the other or vice versa, and means for holding said shaft in locked position.

In testimony whereof I have hereunto set my hand in presence of two subscribing witnesses.

JOHN W. BRANNON.

Witnesses:
W. G. CALDWELL,
H. L. GEORGE.